(No Model.)

W. E. NICKERSON.
FLUID SPEED REGULATOR FOR ELEVATORS.

No. 396,950. Patented Jan. 29, 1889.

WITNESSES.
Frank H. Parker
William Edson

INVENTOR.
William E. Nickerson

UNITED STATES PATENT OFFICE.

WILLIAM E. NICKERSON, OF CAMBRIDGE, MASSACHUSETTS.

FLUID SPEED-REGULATOR FOR ELEVATORS.

SPECIFICATION forming part of Letters Patent No. 396,950, dated January 29, 1889.

Application filed September 25, 1888. Serial No. 286,322. (No model.)

*To all whom it may concern:*

Be it known that I, WILLIAM E. NICKERSON, of Cambridge, in the county of Middlesex and State of Massachusetts, have invented certain new and useful Improvements in Fluid Speed-Regulators for Elevators, of which the following, taken in connection with the accompanying drawings, is a specification.

The object of my invention is to so construct the piston and its connected parts (in fluid speed-regulators) that no piston-rod packing-boxes are required, and also to so form the passages for fluid from one side of the piston to the other that the velocity of current through them shall be checked in an increasing proportion to the velocity of the piston—that is, of the attached machinery. This object I attain by the mechanism shown in the accompanying drawings, in which—

Figure 1:
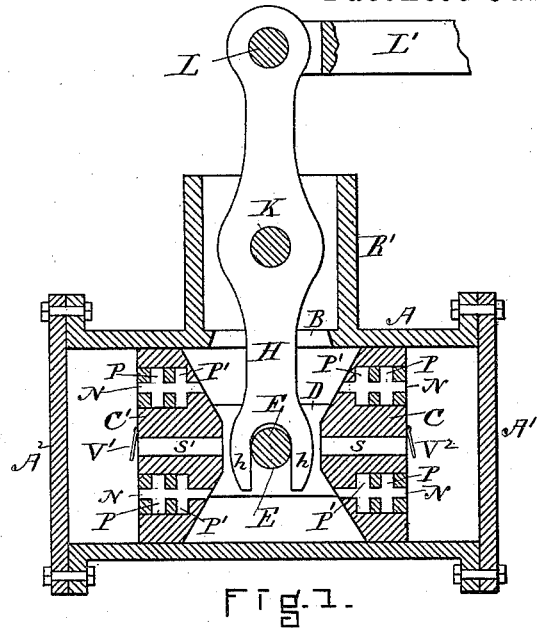
Figure 2:
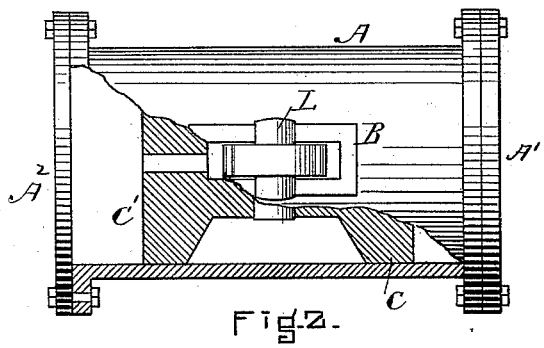
Figure 3:
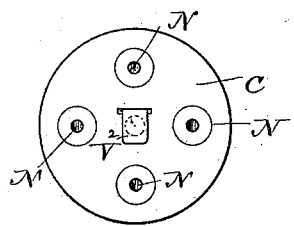

Figure 1 is a vertical section taken lengthwise, so as to show the piston and the mechanism by which motion is imparted to it. Fig. 2 is a plan, a part of the cylinder being represented as broken out to show the piston more clearly; and Fig. 3 is a plan showing one end of the piston.

In the construction of fluid speed-regulators of the class in which a piston moves in a cylinder full of oil or other suitable fluid, said fluid passing through passages from one side of the piston to the other at each movement of the piston, it has been found practically impossible to prevent the fluid from leaking through any piston-rod packing-box that can be made. In my device I have so made the parts that no piston-rod packing-boxes are required, as will be explained.

In Fig. 1, A A' A² represent a cylinder closed at each end, but having an opening in the side, as indicated at B, Figs. 1 and 2. The piston is made with two heads, C and C', which are connected by a neck, D. Motion is imparted to the piston C C' by means of a lever, H, said lever H being pivoted by means of a pin, K, passing through it and being made fast to the sides of the housing B'. The lower end of the lever H is forked, as indicated at $h\ h$, Fig. 1. Said fork $h\ h$ embraces a pin, L, so that any motion imparted to the lever H will be transferred to the piston C C'.

L', Fig. 1, is a link connected to the lever H by a pin, L. The link L' serves to connect the speed-regulating device to the mechanism the speed of which is to be regulated.

The lever H and the link L' may be dispensed with, and any other ordinary connections may be made for uniting the piston C C' to the machine to be regulated.

The piston C C' has orifices S S' at its ends, which are provided with valves V' V², adapted to open alternately as the piston moves back and forth—that is, when the piston is moving away from the end A' then the valve V² will open and allow the fluid to pass freely through the orifice S, so as to fill the space between the end C of the piston and the end A' of the cylinder. The same may be said of the valve V'.

To regulate the flow of the fluid through the piston from the end of the cylinder toward the center, and thus to make the device act as a speed-regulator, I have the following-described device: In each of the parts C C' of the piston I have one or more openings, N. These openings N are connected with interior chambers, P P', so that as the fluid flows through the stream will be broken and form eddies in the chambers and be retarded in an increased degree, the amount of retardation being in an increasing ratio to the velocity of the current, which in turn is always in proportion to the speed of the piston, and of course to the speed of the attached mechanism.

From the above it may be seen that the flow of fluid from the center of the cylinder to the end from which the piston is moving is practically unrestricted, as the valves V' and V² freely open to admit of this flow, but that the flow of fluid from the end of the cylinder through the piston to the center is restricted, so as to render the device a speed-regulator, as has been set forth.

I do not claim in this application the combination, with the piston, of the opening N, having interior chambers, P P', as that is now claimed in my application, No. 285,995, now pending.

I claim—

1. In a fluid speed-regulator, the combination of the cylinder A, having a lateral opening, B, with the piston C C', adapted to admit through it a restricted flow of fluid, and an actuating-arm, substantially as described, and for the purpose set forth.

2. In a fluid speed-regulator, the combination of the cylinder A, having a lateral opening, B, with passages for conducting the fluid from one side of the piston to the other, and the piston C C', having automatic valves V' V², substantially as described, and for the purpose set forth.

WILLIAM E. NICKERSON.

Witnesses:
FRANK G. PARKER,
WILLIAM EDSON.